Patented Nov. 10, 1953

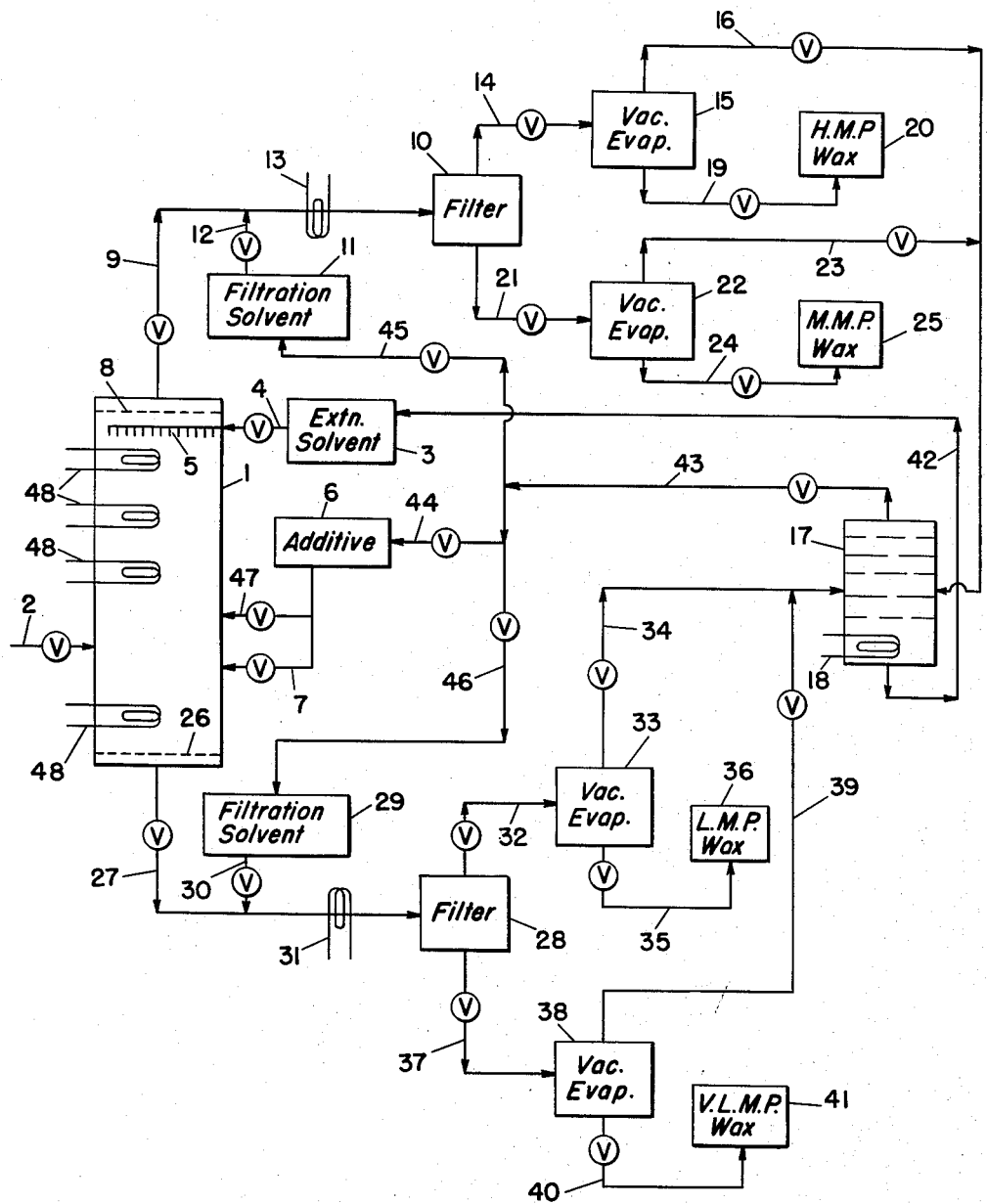

2,658,853

UNITED STATES PATENT OFFICE 2,658,853

SOLVENT FRACTIONATION OF WAX-CONTAINING MIXTURES

Edgar W. Clarke, Laurel Springs, N. J., assignor to The Atlantic Refining Company, Philadelphia, Pa., a corporation of Pennsylvania Application June 29, 1951, Serial No. 234,381

5 Claims. (Cl. 196—17)

The present invention relates to the treatment of oily waxes, and more particularly to the separation of wax-containing mixtures into several fractions of higher and lower melting points.

The present invention is especially applicable to the de-oiling of hydrocarbon waxes containing not more than about 70% of oil, and to the separation of wax mixtures of low oil content into fractions of different melting points. The process of the present invention may be applied in the refining, purification, or separtion of wax stocks such as petroleum slack wax, crude microcrystalline wax, paraffin waxes, petrolatum wax, montan wax, ceresin, ozokerite, waxes from the destructive or non-destructive hydrogenation of mineral oil, synthetic hydrocarbon oil, shale oil, coal, and waxes produced synthetically by the catalytic reaction of hydrocarbons, or waxes derived from the modified Fischer-Tropsch reaction of carbon monoxide and hydrogen. The process of this invention is especially applicable to the separation of wax mixtures containing color bodies and oil into a high melting wax fraction of very light color and substantially free of oil, a moderate melting wax fraction of light yellow color and low oil content, and suitable, for example, for the production of chlorinated wax, a low melting wax fraction also of light yellow color and of low oil content, suitable for use, for example, as stock for milk carton wax, and a very low melting wax fraction of darker color and containing most of the oil originally present in the wax mixture.

In accordance with this invention, a wax-containing mixture is first separated into two fractions of higher and lower melting point by countercurrently contacting the wax-containing mixture in an extraction zone with an extraction solvent and a solvent additive at a temperature such that two liquid phases are formed, one comprising the higher melting wax fraction, or raffinate phase, with minor amounts of solvent and additive, and the other comprising the lower melting wax fraction, or extract phase, with major amounts of solvent and additive, and separating the liquid phases from one another. The success of the solvent extraction depends upon the control of the temperature throughout the extraction zone, upon the regulation of the proportions of solvent and additive used, and the points of introduction of the wax-containing mixture, the solvent, and the additive into the extraction zone. The raffinate phase and the extract phase are each separated into two fractions of different melting points by separately contacting such phases with a filtration solvent at a temperature such that a solid phase and a liquid phase are formed, in each case the solid phase comprising a higher melting wax fraction with minor amounts of extraction solvent and additive filtration solvent, and the liquid phase comprising a lower melting wax fraction with major amounts of the extraction solvent and additive and filtration solvent, separating by filtration the solid and liquid phases one from another, and removing the extraction solvent and additive, and filtration solvent, from each. Thus from the raffinate phase from solvent extraction there is produced a hard, white, substantially oil-free wax of high melting point, and a soft, light colored wax of moderate melting point and approximately the melting point of the untreated wax mixture, which is suitable, for example, for the production of chlorinated wax. From the extract phase from solvent extraction there is produced a light yellow-to-brown wax of a low melting point which is pliable and useful, for example, as stock for milk carton waxes, and a dark brown wax of still lower melting point containing a large portion of the oil and color forming bodies present in the original untreated wax mixture. The success of the solvent filtration depends upon the control of the temperature, and upon the regulation of the proportion of filtration solvent used.

The extraction solvent may be defined as an agent which, when intimately mixed with a wax-containing mixture, forms two liquid phases or layers, one comprising a raffinate phase containing mostly wax of higher melting point than the untreated wax and a portion of the solvent, and the other comprising an extract phase containing mostly solvent, and wax of lower melting point than the untreated wax, as well as a major portion of the color bodies and oil originally present in the untreated wax. The extraction solvent employed in accordance with the present invention is anhydrous phenol.

The solvent additive may be defined as an agent used in conjunction with the extraction solvent for the purpose of modifying the characteristics of the extraction solvent. The additive employed in the process of the present invention is water, or water containing small amounts of phenol, that is, up to about 10% by weight phenol.

The filtration solvent may be defined as an agent which, when mixed with a wax-containing mixture, forms a solid phase and a liquid phase, the solid phase comprising a higher melting wax fraction with minor amounts of filtration solvent and the liquid phase comprising a lower melting wax fraction with major amounts of filtration solvent. The filtration solvent employed in accordance with the present invention is water, or water containing up to about 10% by weight of phenol.

The extraction solvent may be employed in amounts ranging from 2.9 to 3.1 volumes solvent per volume of untreated wax stock, while the additive may be used in amounts ranging from 0.2 to 0.4 volume per volume of untreated wax. The filtration solvent may be employed in treatment of the raffinate phase from solvent extraction in amounts ranging from 0.4 to 0.6 volume per volume of untreated wax, and in treatment of the extract phase from solvent extraction in amounts ranging from 1.1 to 1.3 volumes per volume of untreated wax.

The solvent extraction steps of the present invention may be carried out in a multi-stage batch countercurrent extraction system or in a continuous countercurrent extraction system, preferably a tower provided with perforated baffles or containing a packing material such as ceramic shapes, tiles, metal wool, or fragments of ceramic material, glass, pumice, carborundum, or concrete. For most effective operation, a temperature gradient is maintained in the system by means of heating or cooling coils or jackets, the temperature increasing in the direction of flow of the raffinate or higher melting wax fraction. In carrying out the filtration extraction, any conventional type of filtering apparatus may be employed, such as a continuously rotating drum filter.

The present invention may be further understood with reference to the accompanying drawing which illustrates diagrammatically a continuous extraction system suitable for carrying out the solvent extraction of the process.

Referring to the drawing, a dark colored petroleum slack wax having a melting point of 112.6° F. and an oil content of 41.3% is continuously introduced, in liquid condition, into the extraction tower 1 through valve-controlled pipe 2 at a rate of 100 volumes per hours. An extraction solvent comprising anhydrous phenol is continuously introduced from vessel 3 by means of valve-controlled pipe 4 and manifold 5 into the upper section of the tower below the raffinate outlet at a rate of 300 volumes per hour. The solvent additive comprising substantially pure water is continuously introduced from vessel 6 through valve-controlled pipe 7 into extraction tower 1 below the wax inlet at a rate of 30 volumes per hour. An intimate countercurrent contacting of the wax stock, the extraction solvent, and the additive is effected in tower 1, a temperature gradient being maintained in the tower by means of coils 48 through which a heating or cooling medium is circulated as required. The temperature adjacent the top of the tower is held at 190° F. and adjacent the bottom of the tower at 110° F., the contents being entirely in the liquid phase. The wax stock, being subjected to the action of the solvent and additive, is caused to separate by solvent action into two fractions, the higher melting wax fraction passing upwardly through the tower together with a minor amount of dissolved extraction solvent and additive, and being withdrawn therefrom above the level of the dotted line 8 representing the higher melting wax phase relatively free of entrained, immiscible solvent and additive.

The raffinate phase comprising the higher melting wax and dissolved solvent and additive is passed from the top of tower 1 through valve-controlled pipe 9 to filter 10. To the raffinate phase, filtration solvent comprising water is added at a rate of 50 volumes per hour from vessel 11 through valve-controlled pipe 12. The raffinate phase, being subjected to the filtration solvent, is caused to separate by solvent action into a solid phase and a liquid phase, the solid phase comprising high melting wax with a minor portion of phenol and water (extraction solvent, additive and filtration solvent) and the liquid phase comprising moderate melting wax with a major portion of phenol and water (extraction solvent, additive and filtration solvent). The solid and liquid phases are brought to a temperature of 110° F. by means of coil 13 through which a heating or cooling medium as required is circulated, and then are separated by means of filter 10. The solid phase (precipitate) comprising the high melting wax and a minor amount of phenol and water is passed from filter 10 through valve-controlled pipe 14 into a vacuum evaporator or still 15 wherein the phenol and water are removed from the high melting wax by vaporization, the phenol and water passing through pipe 16 into fractionating tower 17 provided with a reboiler or heating coil 18, while the higher melting wax is drawn from the bottom of evaporator 15 and delivered by valve-controlled pipe 19 into storage vessel 20. This high melting wax was white, had a melting point of 139.6° F., and was substantially free of oil, the yield being 35.7% of the wax stock originally charged. Similarly, the liquid phase (filtrate) comprising moderate melting wax and major amounts of phenol and water is passed from filter 10 through valve-controlled pipe 21 into a vacuum evaporator 22 wherein the phenol and water are removed from the moderate melting wax by vaporization, the phenol and water being added to that from vacuum evaporator 15 by means of valve-controlled pipe 23 and thence passing through pipe 16 into fractionating tower 17, as described above, while the moderate melting wax is drawn from the bottom of evaporator 22 and delivered by valve-controlled pipe 24 into storage vessel 25. Such moderate melting wax was a very light yellow color, and had a melting point of 111° F. and an oil content of 1.0% by weight, the yield being 49.3% of the wax stock originally charged. The oil content, as well as the oil contents set forth below, were determined by the A. S. T. M. Method D721–44 (1946).

The extract phase from the solvent extraction process comprising the lower melting wax fraction, color bodies, oil, and the major portion of the extraction solvent and additive is withdrawn from the lower section of tower 1 beneath the level of the dotted line 26 representing the extract phase relatively free of entrained, higher melting wax. Such extract phase is separated by solvent filtration into two wax fractions of different boiling points much in the same way as the raffinate phase. Thus, the extract phase is passed from tower 1 through valve-controlled pipe 27 into filter 28. To the extract phase, filtration solvent comprising water is added, at a rate of 120 volumes per hour, from vessel 29 through valve-controlled pipe 30. The extract phase, being subjected to the filtration solvent, is caused to separate by solvent action into a solid phase and a liquid phase, the solid phase comprising low melting wax with a minor portion of phenol and water (extraction solvent, additive, and filtration solvent) and the liquid phase comprising very low melting wax with a major portion of phenol and water. The solid and liquid phases are brought to a temperature of 80° F. by means of coil 31 through which a heating or cooling medium, as required, is circulated and then are separated by means of a filter 28. The solid phase (precipitate) comprising the low melting wax and a minor amount of phenol and water is passed from filter 28 through valve-controlled pipe 32 into a vacuum evaporator or still 33 wherein the phenol and water are removed from the high melting wax by vaporization, the phenol and water passing through pipe 34 into fractionating tower 17 while the low melting wax is drawn from the bottom of evaporator 33 and delivered by valve-controlled pipe 35 into storage vessel 36. This low melting wax was a light yellow in color, and had a melting point of 103° F. and an oil content of 4.8% by weight, the yield being 10% of the wax stock originally charged. Similarly the liquid phase (filtrate) comprising very low melting wax, color bodies, oil, and a major portion of phenol and water is passed from filter 28 through valve-controlled pipe 37 into a vacuum evaporator 38 wherein the phenol and water are removed from the very low melting wax by vaporization, the phenol and water being added to that from vacuum evaporator 33 by means of valve-controlled pipe 39 and thence passing through pipe 34 into fractionating tower 17 while the very low melting wax is drawn from the bottom of evaporator 38 and delivered by valve-controlled pipe 40 into storage vessel 41. Such very low melting wax was a dark brown color, and had a pouring point of 77° F., the yield being 38.6% of the wax stock originally charged.

The extraction solvent, additive, and filtration solvent vapors (phenol and water) passed into fractionating tower 17 from vacuum evaporators 15, 22, 33, and 38 are fractionated, the extraction solvent, that is, anhydrous phenol, being drawn from the bottom of the tower as a liquid and returned by means of pipe 42 to the solvent storage vessel 3 for reuse. The additive and the filtration solvent, that is, the water separated from the phenol by fractionation in tower 17, is taken overhead as vapor by pipe 43 and a part thereof returned by pipe 44 to the additive storage vessel 6, another portion by pipe 45 to the filtration solvent storage vessel 11, and the remainder to filtration solvent storage vessel 29 by pipe 46 for reuse. This water may contain small amounts of phenol (up to 10%), the presence of which is not deleterious to the operation of the process.

Depending upon the temperature of operation, the additive may be introduced somewhat above the point of introduction of the liquefied wax stock, for example, by means of valve-controlled pipe 47 rather than through valve-controlled pipe 7.

While in the foregoing example a continuous countercurrent extraction system was described to exemplify the present invention, it is to be understood that the extraction may be carried out in a multi-stage batch countercurrent system. In the event that the extraction is thus carried out using the extraction solvent, additive, and filtration solvent specifically set forth above, the wax stock would be introduced into the first stage extractor, the extraction solvent would be introduced into the third stage extractor, and the additive would be introduced either into the first or second stage extractor. The extract phase would be removed from the first stage extractor while the raffinate phase would be removed from the third stage extractor. The temperature would be 110° F. in the first stage, 150° F. in the second stage, and 190° F. in the third stage, using the slack wax stock described hereinabove. The filtration apparatus and the temperatures for carrying out the filtration obviously would remain the same.

I claim:

1. The method of separating a wax-containing mixture into fractions of different melting points which comprises concurrently contacting said wax-containing mixture in an extraction zone with an extraction solvent and a single solvent additive at a temperature such that two immiscible liquid phases are formed, one comprising a higher melting wax fraction containing solvent and additive, and the other comprising solvent and additive and a low-melting wax fraction, separating the phases one from another, separately adding to each of the phases a filtration solvent at a temperature such that a solid phase and a liquid phase are formed, in each case the solid phase comprising a higher melting wax fraction containing a minor portion of extraction solvent, additive, and filtration solvent, and the liquid phase comprising a lower melting fraction containing a major portion of extraction solvent, additive and filtration solvent, and removing the extraction solvent, additive and filtration solvent from each fraction, the extraction solvent consisting of 2.9–3.1 volumes of substantially anhydrous phenol per volume of wax-containing mixture, the additive consisting of 0.2–0.4 volumes of water per volume of wax-containing mixture, and the filtration solvent comprising water.

2. The method of separating a wax-containing mixture into fractions of different melting points which comprises concurrently contacting said wax-containing mixture in an extraction zone with an extraction solvent and a single solvent additive at a temperature such that two immisicible liquid phases are formed, one comprising a higher melting wax fraction containing solvent and additive, and the other comprising solvent and additive and a low-melting wax fraction, separating the phases one from another, separately adding to each of the phases a filtration solvent at a temperature such that a solid phase and a liquid phase are formed, in each case the solid phase comprising a higher melting wax fraction containing a minor portion of extraction solvent, additive, and filtration solvent, and the liquid phase comprising a lower melting wax fraction containing a major portion of extraction solvent, additive and filtration solvent, and removing the extraction solvent, additive and filtration solvent from each fraction, the extraction solvent consisting of 2.9–3.1 volumes of substantially anhydrous phenol per volume of wax-containing mixture, the additive consisting of 0.2–0.4 volumes of water per volume of wax-containing mixture, and the filtration solvent comprising water and being added to the higher melting wax fraction produced during the solvent extraction in an amount from .04 to .06 volumes per volume of wax-containing mixture, and to the lower melting wax fraction produced during the solvent extraction in an amount from 1.1 to 1.3 volumes per volume of wax-containing mixture.

3. The method of separating a wax-containing mixture into fractions of different melting points which comprises concurrently contacting said wax-containing mixture in an extraction zone with an extraction solvent and a single solvent additive at a temperature such that two immiscible liquid phases are formed, one comprising a higher melting wax fraction containing solvent and additive, and the other comprising solvent and additive and a low-melting wax fraction, separating the phases one from another, separately adding to each of the phases a filtration solvent at a temperature such that a solid phase and a liquid phase are formed, in each case the solid phase comprising a higher melting wax fraction containing a minor portion of extraction solvent, additive, and filtration solvent, and the liquid phase comprising a lower melting wax fraction containing a major portion of extraction solvent, additive and filtration solvent, and removing the extraction solvent, additive and filtration solvent from each fraction, the extraction solvent consisting of 2.9–3.1 volumes of substantially anhydrous phenol per volume of wax-containing mixture, the additive consisting of 0.2–0.4 volumes of water per volume of wax-containing mixture, and the filtration solvent comprising water containing up to 10% by weight of phenol and being added to the higher melting wax fraction produced during the solvent extraction in an amount from .04 to .06 volume per volume of wax-containing mixture, and to the lower melting wax fraction produced during the solvent extraction in an amount from 1.1 to 1.3 volumes per volume of wax-containing mixture.

4. The method of separating a wax-containing mixture into fractions of different melting points which comprises concurrently contacting said wax-containing mixture in an extraction zone with an extraction solvent and a single solvent additive at a temperature such that two immiscible liquid phases are formed, one comprising a higher melting wax fraction containing solvent and additive, and the other comprising solvent and additive and a low-melting wax fraction, separating the phases one from another, separately adding to each of the phases a filtration solvent at a temperature such that a solid phase and a liquid phase are formed, in each case the solid phase comprising a higher melting wax fraction containing a minor portion of extraction solvent, additive, and filtration solvent, and the liquid phase comprising a lower melting wax fraction containing a major portion of extraction solvent, additive and filtration solvent, and removing the extraction solvent, additive and filtration solvent from each fraction, the extraction solvent being introduced into the extraction zone near the point of withdrawal of the higher melting wax fraction, the additive being introduced adjacent the point of introduction of the wax-containing mixture, the extraction solvent consisting of 2.9–3.1 volumes of substantially anhydrous phenol per volume of wax-containing mixture, the additive consisting of 0.2–0.4 volume of water per volume of wax-containing mixture, and the filtration solvent comprising water and being added to the higher melting wax fraction produced during the solvent extraction in an amount from .04 to .06 volume per volume of wax-containing mixture, and to the lower melting wax fraction produced during the solvent extraction in an amount from 1.1 to 1.3 volumes per volume of wax-containing mixture.

5. The method of separating a wax-containing mixture into fractions of different melting points which comprises concurrently contacting said wax-containing mixture in an extraction zone with an extraction solvent and a single solvent additive at a temperature such that two immiscible liquid phases are formed, one comprising a higher melting wax fraction containing solvent and additive, and the other comprising solvent and additive and a low-melting wax fraction, separating the phases one from another, separately adding to each of the phases a filtration solvent at a temperature such that a solid phase and a liquid phase are formed, in each case the solid phase comprising a higher melting wax fraction containing a minor portion of extraction solvent, additive, and filtration solvent, and the liquid phase comprising a lower melting wax fraction containing a major portion of extraction solvent, additive and filtration solvent, and removing the extraction solvent, additive and filtration solvent from each fraction, the extraction solvent being introduced into the extraction zone near the point of withdrawal of the higher melting wax fraction, the additive being introduced between the point of introduction of the wax-containing mixture and the point of withdrawal of the lower melting wax fraction, the extraction solvent consisting of 2.9–3.1 volumes of substantially anhydrous phenol per volume of wax-containing mixture, the additive consisting of 0.2–0.4 volume of water per volume of wax-containing mixture, and the filtration solvent comprising water and being added to the higher melting wax fraction produced during the solvent extraction in an amount from .04 to .06 volume per volume of wax-containing mixture, and to the lower melting wax fraction produced during the solvent extraction in an amount from 1.1 to 1.3 volumes per volume of wax-containing mixture.

EDGAR W. CLARKE.

References Cited in the file of this patent

UNITED STATES PATENTS

| Number | Name | Date |
|---|---|---|
| 2,541,340 | Clarke | Feb. 13, 1951 |
| 2,544,307 | Fourrier et al. | Mar. 6, 1951 |
| 2,550,058 | Gee | Apr. 24, 1951 |